Figure 1:
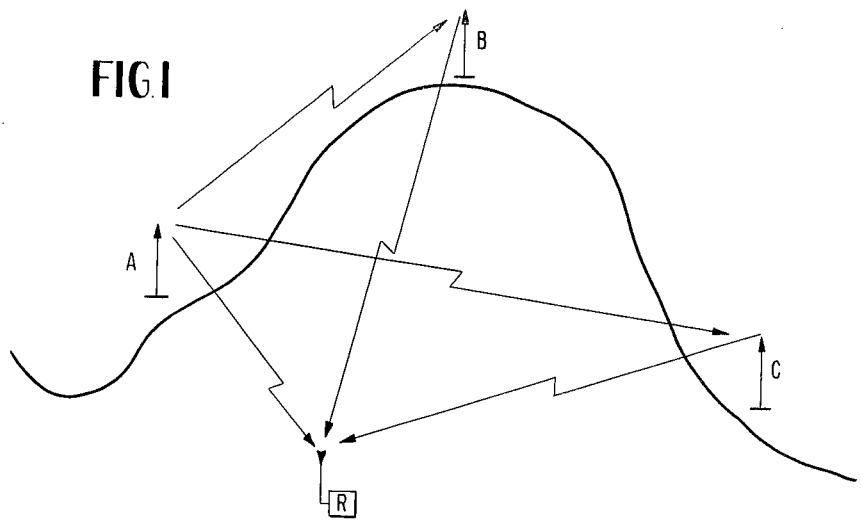

March 22, 1966

E. A. H. HONORÉ ET AL 3,242,492

RADIOLOCATION SYSTEMS

Filed Dec. 3, 1962

5 Sheets-Sheet 1

INVENTORS
ETIENNE AUGUSTIN HENRY HONORE
EMILE LEON GABRIEL TORCHEUX

BY Paul M. Craig, Jr.

ATTORNEY

March 22, 1966    E. A. H. HONORÉ ET AL    3,242,492

RADIOLOCATION SYSTEMS

INVENTORS
ETIENNE AUGUSTIN HENRY HONORÉ
EMILE LEON GABRIEL TORCHEUX

BY Paul M. Craig
ATTORNEY

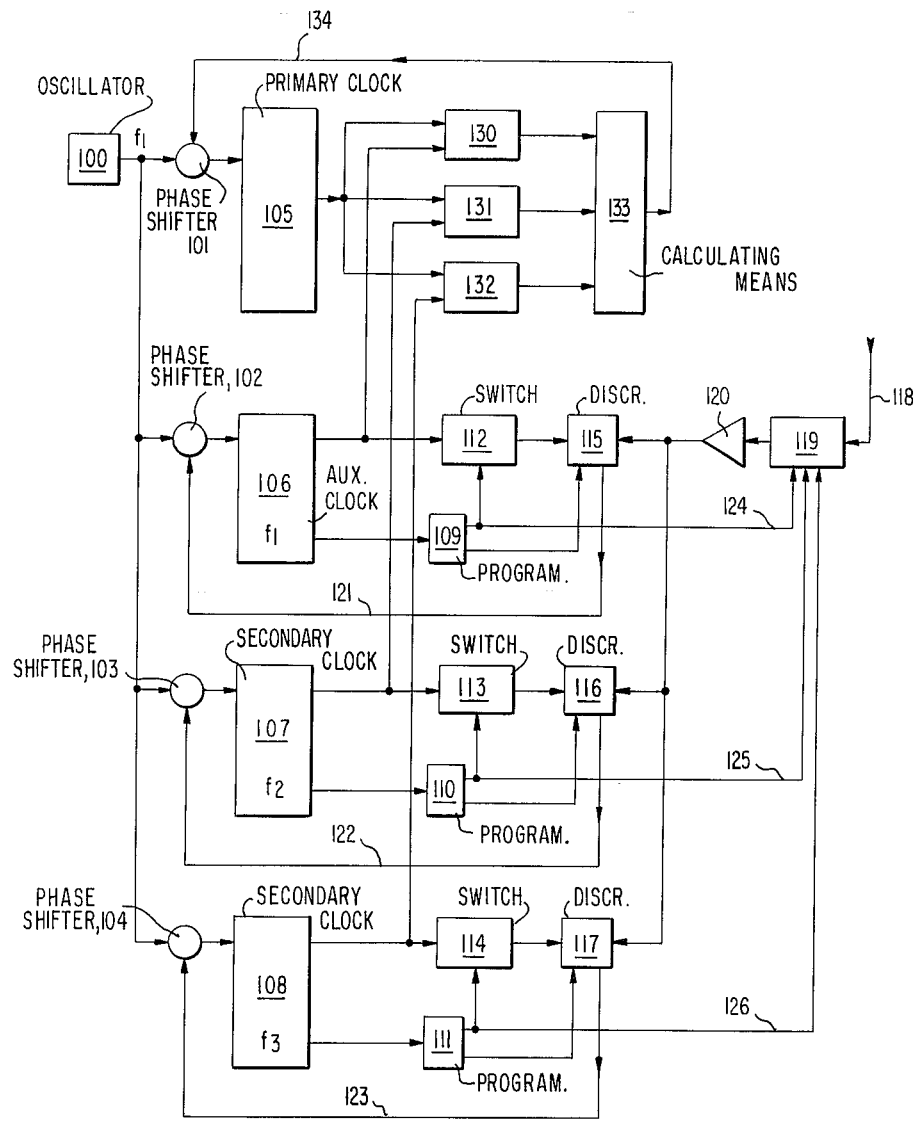

3,242,492
RADIOLOCATION SYSTEMS
Etienne Augustin Henry Honoré and Emile Léon Gabriel
Torcheux, Paris, France, assignors to Societe d'Etude
et d'Application des Techniques Nouvelles Neo-Tec,
Paris, France, a corporation of France
Filed Dec. 3, 1962, Ser. No. 241,780
Claims priority, application France, Dec. 9, 1961,
881,503
17 Claims. (Cl. 343—105)

Our invention has for its object a wireless system for defining the location of a point and, consequently, it covers the applications of such systems to radiolocation, radionavigation and recording of the paths travelled over.

According to a first well-known method, it is possible to measure phases by producing continuous pure or non-modulated waves, starting from transmitters located at known locations, the phases of which are in a predetermined relationship whereby the measurement at the receiving station of the differences in phase of the currents derived from the incoming waves, allows defining the location of the receiving station with reference to the transmitting stations.

According to an also well-known method, it is possible to improve the last-mentioned method so as to remove any ambiguity which may appear because the indications supplied by the phase-meter of the receiving station measure only fractions of a revolution and do not include measurements of complete revolutions. In other words, the phase meters give out phase angles and cut out the multiples of 360 sexagesimal degrees.

Such an improved system has been disclosed under the name of Rana, and it shows various advantages as far as accuracy and removing of ambiguity is concerned but it has the drawback of being sensitive to the so-called sky waves reflected by the ionosphere and, consequently, its useful range is limited by the interference of said waves.

A further known method consists in resorting no longer to continuous waves, but to pulses produced by transmitters positioned at different known points.

The receiving station measures the time intervals between the moments at which the different pulses are received and it is possible to deduce from such data its position with reference to the transmitter. Such a system is known under the name of Loran and is advantageous since it allows cutting out the sky waves by making use at the receiving station only of the beginning of each of the pulses.

Experience has shown, as a matter of fact, that the arrival of the sky waves is delayed with reference to that of the ground waves or direct waves by a duration of a magnitude of 50 microseconds, and, consequently, the fraction of the pulse extending between the beginning of its reception and 50 microseconds after this beginning cannot be disturbed by the sky waves and may therefore serve as a base for a measurement which is not affected by the sky waves.

However, in contradistinction, the last-mentioned method shows from the outset the drawback of lacking accuracy since the moment of the reception of the pulses by the receiving station cannot be defined with the desired accuracy.

To remove this drawback, it has already been proposed to use no longer only the envelopes of the pulses received, but also as well known in the art, the phase relationship between the high frequency waves radiated by the tarnsmitters, while the pulses are being sent out.

Unfortunately, the lack of accuracy of the pulse envelopes does not allow cutting out easily the ambiguity associated with phase measurements.

In order to remove this last difficulty, it has already been proposed to insert parallel Loran systems operating on frequencies which are only slightly different from each other, for instance only by ten percent. However, it seems that such an arrangement has not led to wholly satisfactory results.

Our present invention covers an improved radiolocation system which is a modification of the above-referred to systems inasmuch as it resorts to a number of generally stationary transmitters and any number of receivers which are generally movable and it allows defining the position of any one of said receivers with reference to said transmitters.

In order to further the disclosure, one of the transmitters will be termed the main transmitter, while the others will be termed the auxiliary transmitters.

Our improved system resorts, on the one hand, to some of the means already resorted to in accordance with the precedingly referred to methods.

Thus, all the transmitters produce in succession a number of pure or non-modulated waves at unvarying frequencies in the form of pulses so as to cut out the effect of sky waves. The frequencies of said waves are the same for all the transmitters and their values are in predetermined ratios with a view to removing any possible ambiguity. The waves of same frequency produced by different transmitters are, with reference to one another, in well-known phase relationship so that the measurements executed at the receiver end allow ascertaining the position of the receiver with an excellent accuracy.

Our improved system resorts also to other means of which the components are well-known per se and which will be described hereinafter, the different components being associated in accordance with the novel principles disclosed hereinafter with a view to obtaining further advantages. One of the chief means incorporated with our invention for obtaining the desired result consists in positioning in each transmitter and in each receiver a so-called primary clock. Each of said primary clocks supplies permanently through the agency of a generator, on the one hand, high frequency waves which are stabilized, for instance, by a high grade quartz at predetermined values, the frequencies and phases of said waves being in perfect harmonic ratios, and, on the other hand, signals which allow defining individually to an extent which allows obtaining the desired result, the cycles of said high frequency waves.

Advantageously, all the primary clocks forming part of the transmitters are in perfect synchronism, for instance with an error within only a fraction of a microsecond, but, of course, they may also be shifted with reference to each other by well-defined time intervals; however, with a view to simplifying the following disclosure, it will be assumed hereinafter that this is not the case.

In all cases, the primary clocks control the transmission at the transmitting stations as concerns both the frequency and the phase of the waves transmitted and the definition of the beginning and of the end of the radiated pulses.

The expression "in perfect synchronism" used hereinabove is to be construed as meaning that if the waves and signals supplied by two of said clocks were transmitted permanently at the same speed to an observer located at equal distances from both clocks, said observer would receive them in a perfectly simultaneous manner.

This means therefore that this is a synchronization independent of the positions and durations of travel of the waves and that it is possible, consequently, to consider the obtainment of perfect synchronism as will be disclosed hereinafter.

Similarly, the primary clock carried by each receiver is also in perfect synchronism with all the primary transmitter clocks.

A further essential means resorted to according to our invention consists in positioning in the different receiving and transmitting stations of the system, so-called secondary clocks.

The structure of the secondary clocks of a given station, whether a receiving or a transmitting station, is similar to that of the primary clocks and they operate under the control of a generator producing waves at an unvarying high frequency which is the same as that controlling the primary clock of said station. Each of said secondary clocks supplies permanently waves and signals which are similar to those supplied by the primary clock, the number of signals being however, if desired, lower.

Each of the secondary clocks forming part of a transmitting or receiving station is controlled in a manner such that it follows the movement of the primary clock of another station, which latter is always a transmitting station with a shift in time equal to the duration of travel of the waves produced by said other station and received at the station provided with the secondary clock considered.

In other words, if the waves and signals supplied by the primary clock considered are transmitted permanently at the normal speed of propagation of the waves to an observer positioned near the secondary clock considered, said observer would find complete synchronism between the currents and signals thus received and those supplied by the secondary clock near which he is positioned.

The above-mentioned control may be termed "a relative synchronization" and we will use said expression hereinafter since the synchronization considered takes into account the distance separating the two stations considered and the time of travel of the waves between the two stations.

Each auxiliary transmitter includes preferably a secondary clock which is set in relative synchronism, for instance with the primary clock of the main transmitter, which may be readily performed by means of waves produced by said main transmitter and received by the auxiliary transmitter considered.

The primary clock of the auxiliary transmitter considered may then be set in perfect synchronism with the primary clock of the main transmitter and it will be sufficient to act on it in a manner such that its lead in operation with reference to the secondary clock of the same auxiliary transmitter may be exactly equal to the duration of travel of the waves over the known distance which separates the two transmitters.

Each receiver is provided with a number of secondary clocks which is equal to the number of transmitters whose transmitted waves are available for use at any moment. Said secondary clocks are set in relative synchronism respectively with the primary clocks of said transmitters, which synchronism may easily be obtained by resorting to the waves produced by said transmitters and received by the receiver considered.

As concerns the perfect synchronization of the primary clock of a receiver with the system of primary clocks of the transmitters, it should be first remarked that if perfect synchronization is accurately obtained, the time differences between said primary clock and each of the secondary clocks of the same receiver supply respectively direct measurements of the distances separating said receiver from each of the transmitters with which said secondary clocks are in relative synchronized relationship. Consequently, as soon as the number of informations thus obtained is larger than the number of informations required for defining accurately the position of the receiver, the supplementary information thus available provides an excellent synchronization of the primary clock of the receiver.

According to our invention, a primary or secondary clock is constituted chiefly by auxiliary oscillators the frequencies of which are controlled by a master oscillator, which auxiliary oscillators supply, on the one hand, the frequencies of the radiated carrier waves and, on the other hand, frequencies the values of which decrease in accordance with a predetermined progression: the last stages of each oscillator are constituted by frequency dividers for instance so-called decatron tubes, the system constituted by said auxiliary oscillators providing means for identification of any period of the frequency of the master oscillator during a period equal to one cycle of the repetition of all the radiated pulses considered as a whole.

It is an easy matter to see that such a clock allows measuring time differences ranging between 0 and several milliseconds with an accuracy which is far higher than a subdivision of the time unit, which is, in the example given out hereinafter $1/1,800 \times 10^3$ seconds.

It will be remarked that, in contradistinction with ordinary clocks, the clock provided in accordance with our invention is not designed for giving out at each moment the actual subdivision of the time unit corresponding to its position. It is designed, on the contrary, in a manner such that its condition at any moment may be compared with that of another clock so as to show the time difference between the two clocks.

It will be readily understood by referring to the arrangement described hereinafter by way of example, that the said time difference between two clocks is obtained by measuring the phase shift between the sinusoidal currents appearing on leads supplying, on the one hand, frequencies $f1$, $f2$, $f3$ and, on the other hand, smaller frequencies of 50 and 1 kilocycle, which is provided as follows:

The difference in phase between the signals at the frequency $f1$ provides an accurate measurement, that is within a fraction of the subdivision of the time unit. Since it is possible to measure and to appreciate angles of $1/100$ of a revolution, it is apparent that said measurement supplies $1/100 \times 1,800 \times 10^3$ fractions of seconds, that is less than $1/100$ of a microsecond.

According to the well-known Rana technique, there is first measured a difference in phase between the signals at a frequency $f2$ and from the difference thus obtained there is subtracted the difference in phase between the signals at a frequency $f1$ so as to obtain a differential value equal as already disclosed, to that which would be supplied by the use of a frequency $f1-f2$. The procedure is the same for the frequency $f3$ so as to obtain the equivalent of a measurement with a wave at a frequency $f1-f3$.

Lastly, the difference in phase between the signals at 50 kilocycles provides a still more reduced sensitivity and finally the difference in phase between the signals of 1 kilocycle allows removing any residual ambiguity.

It should be remarked that the differences in phase thus measured vary only in a comparatively slow manner with time in most of the applications to be considered, which allows displaying them and reading them in an easy manner.

We will now describe a system for executing the invention by means of a main transmitter and two auxiliary transmitters, the number of two auxiliary transmitters being obviously given out only by way of example.

This system includes firstly a first or main transmitter located at a point A and radiating series of $n$ pulses at different carrier frequencies. To make the disclosure simpler, we will suppose hereinafter that $n$ is equal to 3, three different carrier waves being generally sufficient for removing any ambiguity, although of course, in certain particular cases, $n$ may be equal to 2, or else, be given a value above 3.

The carrier frequencies are selected preferably so as to be of a magnitude of about one megacycle, that is, so as to correspond to hectometric wave lengths which are particularly advantageous for the execution of the invention.

Again in conformity with the conventional Rana method, said frequencies are selected in a manner such that differences between measured values provide measurements which correspond to suitably graded sensitivities, with a view to removing any ambiguity.

For instance, said carrier frequencies may have respectively for their values:

$$f1$$
$$f2 = f1 \times (1 + 1/6)$$
$$f3 = f1 \times (1 + 1/36)$$

For instance:

$f1 = 1{,}800$ kilocycles
$f2 = 1{,}800 \, (1 + 1/6) = 2{,}100$ kilocycles
$f3 = 1{,}800 \, (1 + 1/36) = 1{,}850$ kilocycles It is immediately apparent that the differences in the indications given by the instruments associated with the waves at frequencies $f1$ and $f2$ are the same as those which would be given out by an instrument receiving transmissions of which the carrier frequencies are $$f1 - f2 = f1/6$$

whereby it is obvious that the measurement obtained shows a sensitivity which is six times less than that which may be obtained starting from the measurement made with the single frequency $f1$.

Similarly, the difference between the measurements corresponding to the frequencies $f1$ and $f3$ would be the same as that obtained by resorting to the use of a frequency $f1 - f3 = 1/36 f1$, which leads again to a sensitivity thirty-six times less.

Of course, the values of $1/6$ and $1/36 = 1/6^2$ are given only by way of examples.

The two auxiliary transmitters are positioned at points B and C and are designated by the said letters.

The transmitter B produces also series of three pulses in succession with the same carrier waves $f1$, $f2$, $f3$.

Of course, the relationship between the timing of the transmission of these series of pulses is selected in a manner such that in no case the pulses produced by A can reach the receiving station simultaneously with the pulses radiated by B.

Furthermore, it is more advantageous for the series of pulses radiated at A and B not to interfere, that is, whatever may be the position of the receiving station in the space controlled by the radiolocation system, the pulses produced by A arrive always before or after those produced by B.

The transmitting station located at C has the same structure as the station B and the pulses transmitted by it are radiated at predetermined moments, taking into account the above requirements, so that the receiving station may identify without any possible error, the different series of pulses produced by the different transmitters.

The different series of pulses are produced accurately at predetermined moments defined before hand and known by the attendants at the receiving station, which arrangement furthers, as will be disclosed hereinafter, the execution and the operation of the receiver station.

Said result is obtained by making the different generators feed frequencies $f1$, $f2$, $f3$ into a common aerial through gates controlled by the primary clock and through a sampler whereby the waves to be radiated begin to be radiated at accurately predetermined moments of their cycles and last throughout a predetermined time. The clocks control also other operations as disclosed hereinafter:

The main transmitting station includes, as already disclosed, a primary clock which defines the reference time for the radio navigation system. Said primary clock controls furthermore the moments at which the pulses are produced and the duration of said pulses for the three waves radiated in succession as pulses by the main transmitter.

Each auxiliary transmitter includes on the other hand two clocks of which the primary clock operates in perfect synchronism and the other or secondary clock operates under relative synchronous conditions with reference to the clock of the main transmitting station. The primary clock serves for producing the pulses produced and radiated by said auxiliary transmitter while the secondary clock serves for receiving the pulses produced by the main transmitting station which latter pulses allow, as disclosed hereinafter, ensuring the relative synchronization of said secondary clock and also the absolute synchronization of the primary clock.

Each receiving station (the number of receiving stations being obviously unlimited) carries as many secondary clocks as there are transmitting stations, including the main and auxiliary transmitting stations and in addition thereto a primary clock which is set in perfect synchronism with the primary clock of the main transmitting station, each of the secondary clocks of the receiving station being set in relative synchronism with the primary clocks at the main transmitting station and at the auxiliary transmitting stations, which primary clocks control the pulses radiated by said transmitting stations.

Figure 2:
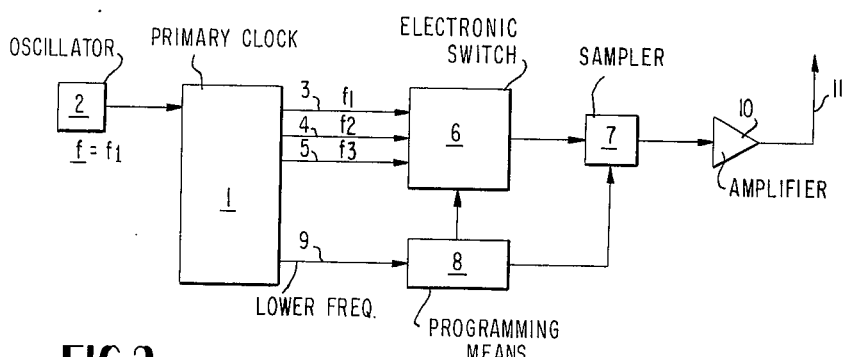
Figure 3:
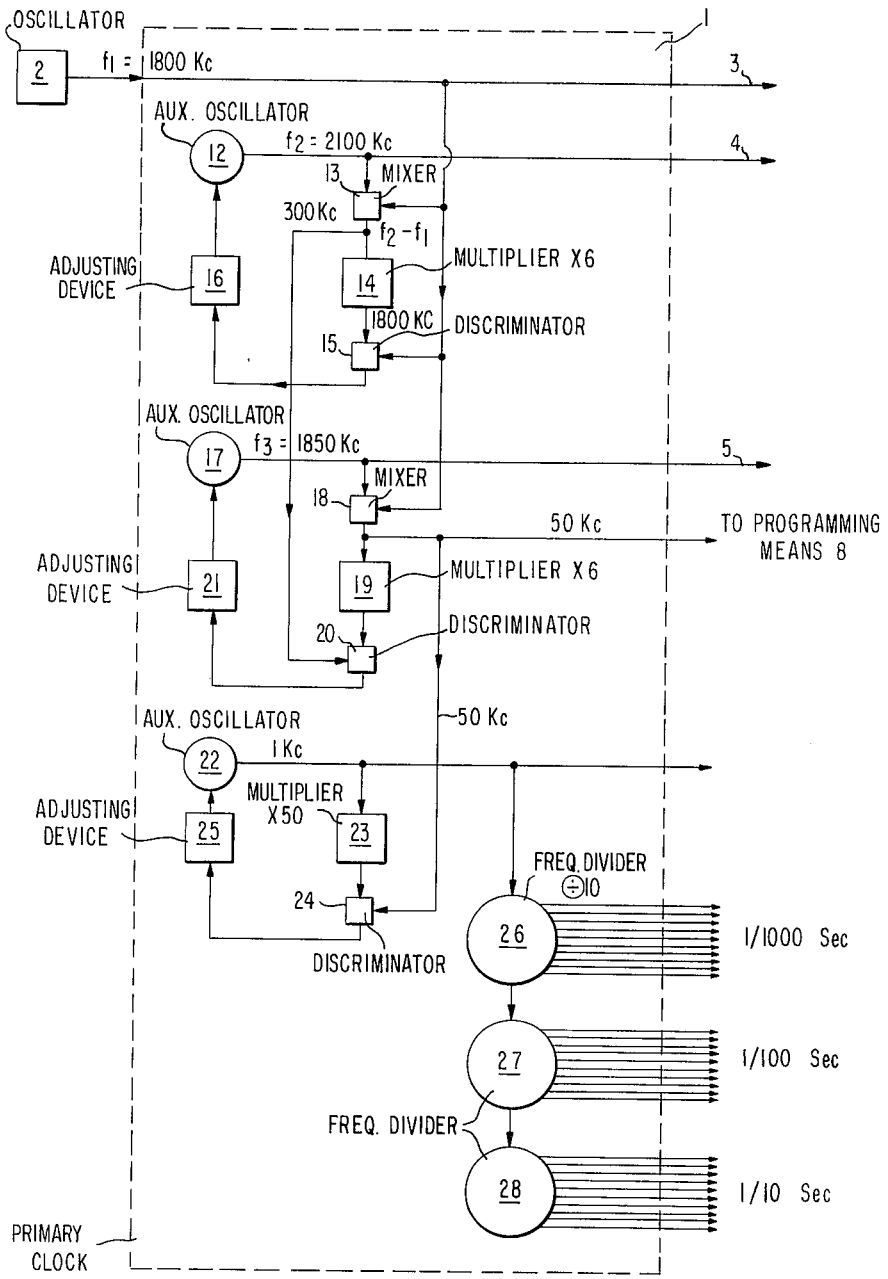
Figure 4:
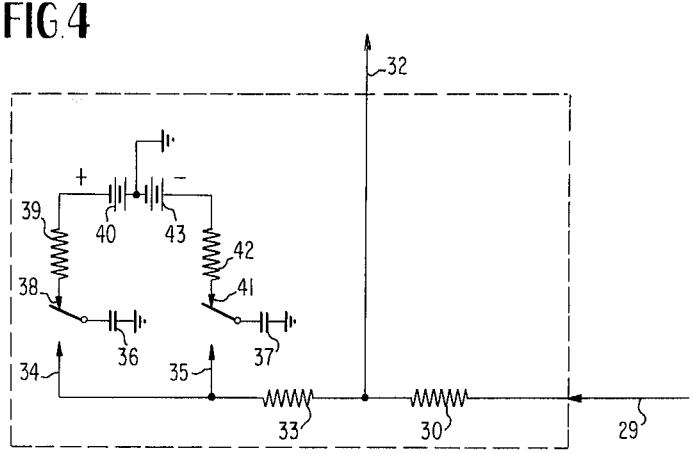
Figure 6:
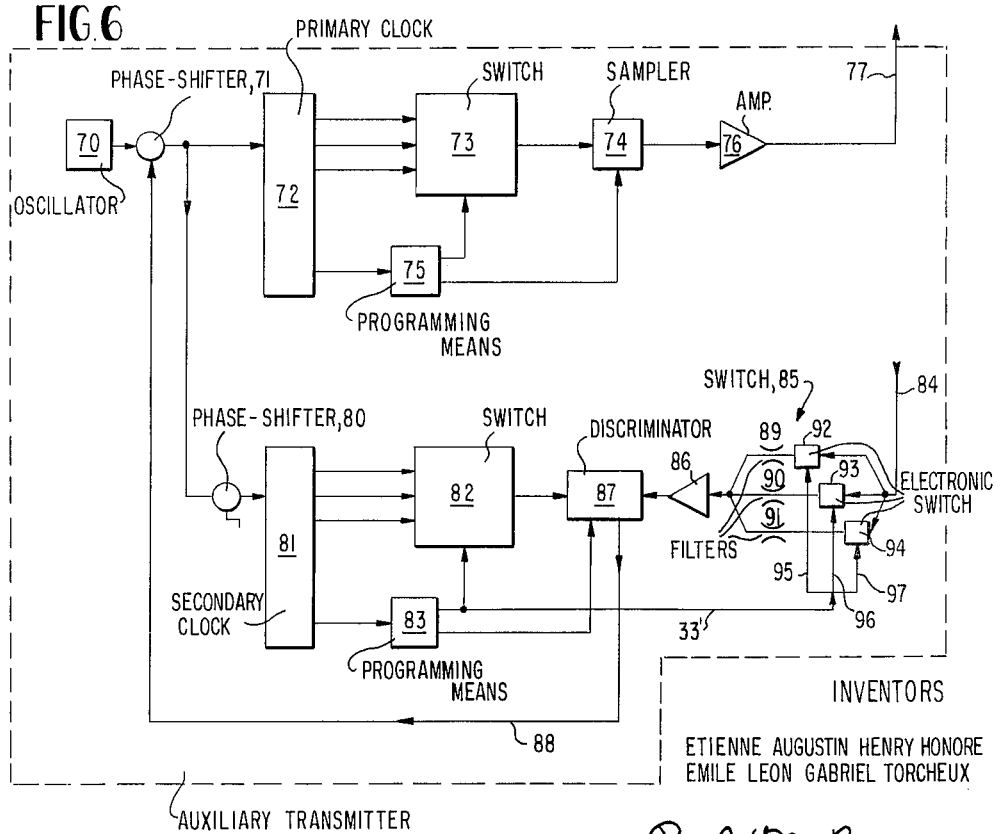
Figure 5:
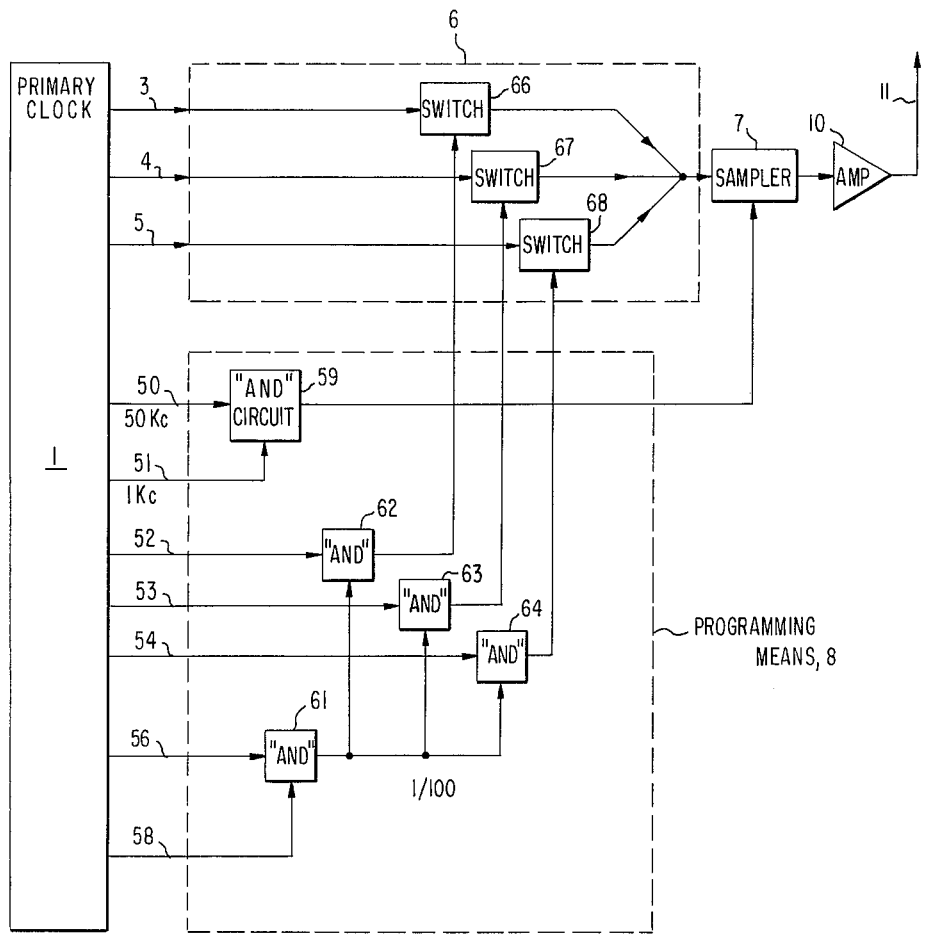

We will now describe our invention with further detail so as to disclose further features thereof together with various advantages which will appear from the reading of the following description of different transmitting and receiving stations, reference being made to the accompanying drawings wherein:

FIG. 1 illustrates the arrangement of the different transmitting and receiving stations, FIG. 2 is a block diagram of the main transmitting station, FIG. 3 is a block diagram of one of the clocks, FIG. 4 is a detail view of the clock showing the means for adjusting the oscillators, FIG. 5 is a detail view showing the programming means and the switch associated therewith, FIG. 6 is a block diagram of an auxiliary transmitter, FIG. 7 is a block diagram of a receiver.

In the drawings, the same reference numbers designate the same elements in the different figures.

Our invention will be better understood from a reading of the following description of a particular embodiment including a main transmitter and two auxiliary transmitters, the pulses being broadcast in successive identical operative cycles of one second each.

At the beginning of the second corresponding to one cycle, the different transmitters produce simultaneously on a predetermined frequency $f4$ which is preferably different from $f1$, $f2$ and $f3$, a signal serving, as disclosed hereinafter, for the identification of the different transmitters.

The second of time which corresponds to the duration of an operative cycle is subdivided into $1/100$ of a second, which leads to the possibility, at least theoretically, of using a main transmitter and 98 auxiliary transmitters.

The identification signal is produced during the first hundredth of a second, the main transmitting station is associated with a further hundredth, say the second hundredth and to each of the auxiliary transmitting stations is allotted a further hundredth. To make the disclosure simpler, it will be assumed hereinafter that the third and fourth hundredth of a second are allotted to the two auxiliary transmitters considered.

The three pulses being produced by a transmitter during the hundredth of a second which is allotted to the latter last each, say 100 microseconds; the pulses at the frequency $f1$ may be produced at the beginning of the corresponding hundredth of a second, the pulse at the frequency $f2$ one thousandth of a second after the first pulse and the pulse at the frequency $f3$ one thousandth of a second after said second pulse.

Obviously, our invention covers also the general principles disclosed hereinabove together with those to be disclosed now and it is by no means limited to the embodiments described given solely so as to allow a better understanding of our invention.

FIG. 1 shows the ararngement of a main transmitting station A associated with two auxiliary transmitting stations respectively at B and at C, which auxiliary stations B and C receive the signals transmitted by A, so as to allow their synchronization.

One of the receiving stations located for instance at R, receives the waves transmitted by the three transmitting stations A, B and C and this allows said receiving station to calculate the distances separating it from said three transmitting stations, which provides redundant information for the definition of its position, since in practice, two distances are sufficient; consequently, as shown hereinafter, the measurement of the third distance supplies means both for checking and correcting any drift of the oscillatory system of the receiver.

The main transmitting station (FIG. 2) includes a primary clock 1, of which the operation is controlled by an oscillator 2, operating at a very stable frequency and incorporating, for instance, a high grade quartz. Said clock receives the frequency $f$ of the quartz, which frequency is selected preferably as equal to the frequency $f1$ of the first wave to be radiated and it includes oscillators of which the frequencies are controlled by the quartz and which supply the frequencies $f2$ and $f3$ of the radiated waves, together with lower frequencies which serve for identifying the successive cycles of the radiated waves, whereby any ambiguity in the measurements is removed through the agency of an electronic switch 6 and a sampler 7 controlled by programming means 8. The frequencies $f1$, $f2$, $f3$ supplied permanently by the clock through the output leads 3, 4, 5 reach the switch 6 thus controlled by the programming means 8 which latter is in turn controlled by the lower modulating frequencies produced by the clock, as shown symbolically by the connection 9, said programming means sending to the switch orders such that the output of the switch may be connected in succession with the leads supplying the frequencies $f1$, $f2$, $f3$ at the actual moment at which the main transmitting station is to radiate the waves at these frequencies $f1$, $f2$, $f3$; furthermore and with a view to properly defining the moment at which each pulse is released and also the moment at which said pulse ends, the output of the switch 6 is connected with the sampler 7 which is also controlled by the programming means 8, so that when it receives an order, the sampler allows the passage of a wave $f1$, $f2$ or $f3$, but only starting from a predetermined instant which is defined with reference to the phase of said wave; for instance said instant may be that at which the voltage produced by said wave passes through zero. Furthermore, the sampler prevents the passage of the pulse after a predetermined number of wave periods or after a well-defined time delay, say 100 microseconds, said end of the pulse occurring also at a predetermined phase angle of the wave. The waves at the output of the sampler gate 7 are amplified by the amplifier 10 and radiated by the aerial 11.

FIG. 3 shows diagrammatically a primary clock 1 and it will be remarked that the different clocks used, whether primary or secondary, have practically the same structure. Such clocks include a main stable oscillatory system 2 supplying across its terminals, the frequency $f1$ as already mentioned, while the output lead 3 is connected therefore directly with the output of said oscillatory system 2.

An auxiliary oscillator 12 produces the frequency $f2$ and its output is connected with the lead 4; said frequency is controlled by making the voltages at the outlet of 2 and of 12 feed together the input of a mixer 13 which produces the frequency $f2-f1$ which, in the case considered, is equal to 300 kilocycles. Said frequency of 300 kilocycles is fed in turn into a multiplier 14 multiplying it by 6 so that the frequency at the output of the multiplier is equal to 1,800 kilocycles, that is, $f1$.

The output of the multiplier 14 and the output of the main oscillator 2 are connected with the input of a discriminator 15 which produces a D.C. control voltage which is a function of the difference in phase between the oscillations of same frequency fed into it. Said D.C. control voltage is fed back through an adjusting system 16 described with further detail hereinafter to the oscillator 12 so as to adjust its frequency, say through a reactance tube. The diagram which has just been disclosed and including the parts 12 to 15 is well-known per se together with its operation which is such that after an accurate adjustment, the oscillator 12 is synchronized, but at a different frequency, with reference to the oscillator 2, some instants of passages through zero of the output voltages registering in time.

A second stage includes an oscillator 17, a mixer 18, a frequency multiplier 19, a discriminator 20 and adjusting system 21; the oscillator 17 supplies the frequency $f3$.

The oscillator 17 is controlled by the frequency $f1$ applied to the mixer 18 and by the 300 kilocycle frequency fed by the output of the mixer 13 to the discriminator 20, the frequency multiplier 19 multiplying as precedingly by 6 the 50 kilocycle frequency fed by the output of the mixer 18, which frequency is fed to the programming means 8 and, when thus multiplied, by 6, supplies, as mentioned, 300 kilocycles to the discriminator 20. This arrangement consists thus in resorting for the second stage to the output voltage of the mixer 13 with a view to using a frequency multiplier 19 having the same multiplying factor as the frequency multiplier 14. The output voltage of the mixer 18 forms thus the first of the operative currents which are to control the programming means 8.

A third stage includes an oscillator 22 producing the 1 kilocycle pulses, a multiplier 23 having a multiplication factor equal to 50, a discriminator 24, an adjusting system 25 and produces across its output terminals a current of 1 kilocycle, the output frequency of the multiplier 23 feeding the discriminator 24 being equal to 50 kilocycles, that is, equal to the output frequency of the mixer 18 which is applied to the other input of the discriminator 24.

The current obtained at the output of the oscillator 22 actuates a first frequency divider adapted to divide by ten and constituted preferably by a so-called decatron tube 26 including ten output terminals which allow selecting one of the thousandths of a second within a predetermined hundredth of a second, as provided by suitable connections.

A second frequency divider of the same type including a tube 27 with 10 output terminals actuated during the passage through zero of the preceding divider, provides the hundredths of a second and actuates, in its turn, a third tube 28 producing the tenths of a second, so that the clock allows subdividing each second into $1,800 \times 10^{-3}$ intervals, as already mentioned hereinabove, the zero or starting point of each of the stages described registering accurately in time with the beginning of each second. The whole system acts after the manner of a gearing controlled by a single motor constituted by the oscillator 2.

It is essential for such a clock to be adjusted easily while respecting the fundamental conditions according to which the passages through zero of the different oscillations are always in registry at the beginning of a cycle, which implies that the shift of an intermediate oscillator such as 12, 17 or 22 can be performed only through an integral number of cycles of the frequency across its terminals.

This is obtained by means of the adjusting systems which are, in principle, all identical, as shown at 16, 21 and 25. Such a system is illustrated in FIG. 4; the input lead 29 is connected with the corresponding mixer 15, 20 or 24, whereas the output lead 32 controls the actual means for adjusting the corresponding oscillator. The input lead 29 is connected through a resistance 30 with the output 32 also connected through a resistance 33 with the stationary contact-pieces 34 and 35 forming two switches with two further corresponding stationary contact-pieces 38 and 41 and with the movable contact-pieces which are grounded through the condensers 36 and 37 respectively. The further stationary contact-piece 38 of the first switch is connected through a resistance 39 with the positive terminal of a source of current 40, the negative terminal of which is grounded. Similarly, the further stationary contact-piece 41 of the second switch is connected through a resistance 42 with the negative terminal of a source 43 identical with 40, said latter source 43 having its positive terminal grounded.

In the position illustrated, the switches are in their upper or right-hand position, the condensers 36 and 37 being charged respectively positively and negatively.

Knobs are provided so as to set transiently the switches into their lower left-hand position and it is apparent that the depression of the knob acting on one of the switches produces the discharge of the corresponding condenser through the resistance 33 into the oscillator adjusting means.

It is a well-known fact that reactance-controlled adjusting means produce a shift in frequency which is proportional to the control voltage and, consequently, the phase shift which is equal to the integral with reference to time of the voltage, is proportional to the amount of electricity supplied by the condenser. The size of the condenser 36 (or 37) is such that its capacity may produce a shift of one cycle. It is therefore apparent that, according as to whether one or the other of the relay knobs is depressed, the corresponding oscillator is shifted forwardly or rearwardly by one cycle. The adjusting system described hereinabove allows, through the correcting action provided by it, a shift of the oscillator by exactly one cycle.

When it is desired to shift an oscillator by $n$ cycles, in either direction, it is therefore sufficient to depress $n$ times the desired knob.

FIG. 5 shows the detail of the programming means 8 and of the switch 6. Reference numeral 7 designates again the sampler and 10 the amplifier, 11 the serial and 1 the clock with its output leads 3, 4 and 5, whereas the leads 50 to 58 provide the operative currents, to wit: 50 supplies the current at a frequency of 50 kilocycles, 51 the current at a frequency of 1 kilocycle, and 52, 53, 54 designate three leads connected with suitably selected tappings of the decatron tube 26. 56 designates a lead connected with an adjustable tapping on the decatron 27 and, lastly, 58 designates a lead connected with an adjustable tapping of the decatron 28. The programming means include furthermore logical members of the AND type provided with two inputs and one output. It is a well-known fact that said AND members supply an output pulse when two pulses are applied simultaneously to their inputs. The leads 50 and 51 are connected with such a member 59 supplying a very short pulse, of which the beginning is defined by the 50 kilocycle wave, this being done for each passage through zero, for instance in a rising direction, of the 1 kilocycle wave. The pulse at the output of 59 controls the sampler 7.

61 designates another AND member of which the inputs are connected with the leads 56 and 58 and there is collected therefore at the output of 61, a pulse of a duration of one hundredth of a second once every second, the shift in time with reference to the beginning of the cycle of the pulses at the output of 61 depending on the order number of the terminals of the decatrons 27 and 28 with which the leads 56 and 58 are connected. Each transmitter is defined by such a shift.

62, 63, 64 designate three further AND members. The member 62 has one of its inputs connected with the output of 61 and the other with the lead 52, while the member 63 has its inputs connected with the output of 61 and with the lead 53 and, finally, the member 64 has its input connected with the output of 61 and with the lead 54.

The switch 6 includes three elementary switches 66, 67, 68 of which the inputs are connected respectively with the leads 3, 4 and 5 and the outputs of which are connected together with the input of the sampler 7; the switch 66 is controlled by the output of 62, the switch 67 by the output of 63 and the switch 68 by the output of 64. It is readily apparent that at the output ends of 62, 63, 64, pulses of a duration of $\frac{1}{1000}$ of a second are obtained, which pulses are shifted in time by the desired amount, since the leads 52, 53, 54 are connected for this purpose with suitable tappings of the decatrons 26, whereby the switches 66, 67, 68 are adapted to connect in succession each during one thousandths of a second, the leads 3, 4 and 5 with the input of the sampler 7.

FIG. 6 is a block diagram of an auxiliary transmitter which includes an oscillator 70 which, in principle, is identical with the oscillator 2 of the main transmitting station, but, obviously, said oscillator 70 may show, in fact, a slight shift with reference to the oscillator 2; to remove this shift, the wave produced by 70 is caused to pass through a phase-shifter 71 which delivers the wave at the output of the phase-shifter 71 into accurate phase relationship corresponding to absolute synchronism with the wave at the output of the oscillator 2.

Last-mentioned wave series for controlling the primary clock 72 of the auxiliary transmitter which is consequently in perfect synchronism with that of the main transmitting station.

The auxiliary transmitting station includes also a switch 73, a sampler 74, programming means 75, an amplifier 76 and an aerial 77 which are identical, except as concerns the adjustment of the programming means, with the corresponding parts of the main transmitting station, so that the aerial 17 radiates pulse trains at the moments defined by the auxiliary station considered, said moments being predetermined through adjustment of the programming means 75.

The auxiliary transmitting station includes also means for ensuring perfect synchronism for the clock 72 by acting on the phase-shifter 71, which means include: a phase-shifter 80 delaying the waves fed into it by said phase-shifter 71 by a duration equal to the time for the direct wireless wave to travel from the main transmitting station to the auxiliary transmitting station considered. Said time of travel is well-known, since the positions of the transmitters on the ground are unvarying and well-known.

The waves fed by the output of 80 control the secondary clock 81 which is consequently, for the reasons disclosed hereinabove, in relative synchronism with reference to the primary clock of the main transmitting station.

Said clock 81 controls a switch 82 and programming means 83 identical respectively with the corresponding switch 73 and with the programming means 75. A receiving aerial 84 receives the waves radiated by the main transmitter and a system 85 including filters 89, 90, 91 allows the passage respectively of the frequencies $f1$, $f2$, $f3$. These filters arranged in parallel are inserted each in its turn by the programming means 83 through the leads shown symbolically at 33'. To this end, the filters 89, 90, 91 are fed through electronic switches 92, 93, 94 controlled through the agency of the leads 95, 96, 97 by control pulses produced at the output of the programming means 83; said pulses are adapted to release each in its turn the three elementary electronic switches of the system 85. The waves at the output of the switch 85 are amplified at 86 and are compared inside the discriminator 87 with the wave fed at the same moment at the output of the switch 82, whereby the wave at the frequency $f1$ which has been received, is compared with the wave at the frequency $f1$ sent out by the clock 81, after which the comparison is made for the wave at the frequency $f2$ and lastly for the wave at the frequency $f3$.

The discriminator 87 is designed so as to execute this comparison only during a very short lapse of time which is well-known, say, for instance, about ten microseconds, the starting of the comparison beginning a few cycles after the front end of the pulse, this being necessary so as to cut out in particular the influence of any sky wave.

This comparison is performed in the discriminator 87, the result of said comparison is averaged by a member forming part of the discriminator 87.

This average voltage forms the output voltage of the discriminator 87 and serves for controlling through the connection 88, the phase-shifter 71. Said phase-shifter 71 includes means which allow an accurate use of said output voltage, in other words, it has to delay said voltage by a value equal to a predetermined transfer function of said voltage which is such that the speed of variation of the phase-shift may be equal to a suitably balanced sum of said voltage and of its integral with respect to time. The term proportional to the value of the voltage is, as a matter of fact, such as will ensure a proper stability during operation of the whole system, whereas the term proportional to the integral leads to the following results:

on the one hand, if said voltage is zero, the speed of phase shift remains unvarying and compensates continuously and permanently the average drift of the oscillator 70 on the other hand, the phase-shifter 71 can receive from the output voltage of the discriminator 87 only the orders required for it to provide a modification either in value or in speed of variation of the phase-shift and, consequently, a correction either of the modifications in phase, or of any residual shift.

It is immediately apparent that due to the phase-shifter 80 which has been adjusted by hand once and for all, which is a very easy matter, since the positions of the transmitters are well-known and produce a predetermined phase-shifting, the switch 82 feeds the discriminator 87 in succession with waves at frequencies $f1$, $f2$, $f3$ and, at the same time, the waves received at 84 which have been amplified and filtered by the filters contained in the system 85, appear across the output terminals of 86 feeding the discriminator, which leads to a synchronization of the clock.

FIG. 7 is a block diagram of the receiver.

The parts illustrated in FIG. 7 are identical with or similar to those already described with reference to the transmitters and they include a stable oscillator 100, for instance a high grade quartz adjusted so as to produce, in principle, the frequency $f1$. Said oscillator feeds four phase-shifters 101, 102, 103 and 104; the wave at the output of 101 controls a primary clock 105 which is brought into absolute synchronism with the primary clock of the main transmitter.

The wave at the output of 102 controls an auxiliary clock 106, the wave at the output of 103 a secondary clock 107 and the wave at the output of 104 a secondary clock 108. The secondary clock 106 is set in relative synchronism with the primary clock of the main transmitter and the secondary clocks 107 and 108 are set in relative synchronism respectively with the primary clocks of the corresponding auxiliary transmitters. Whereas in the transmitting stations, whether the main or auxiliary transmitting stations, the primary clocks control the transmission of the series of pulses, the secondary clocks 106, 107 and 108 at the receiving station control the moments at which the gates of the receiver are opened as will be described hereinafter.

The setting in relative synchronism of the auxiliary clocks with the primary clocks of the corresponding transmitters is performed by resorting to means identical with those described hereinabove with reference to the auxiliary transmitters; these means include consequently the programming means 109, 110 and 111, switches 112, 113 and 114 and discriminators 115, 116 and 117; a receiving aerial 118 receives the waves radiated by the main and auxiliary transmitters. A system 119 similar to the system 85 described hereinabove, is controlled in succession by the programming means 109, 110 and 111, as provided by the leads symbolically illustrated at 124, 125 and 126. The waves passing out of the system 119 are amplified at 120 and compared in succession in the discriminators 115, 116 and 117 with the waves at frequencies $f1$, $f2$ and $f3$ supplied respectively and each in their turn at the outputs of the switches 112, 113, 114; thus, the wave at a frequency $f1$ produced as a pulse by the main transmitter and received by the aerial 118, appears in the discriminator 115 at the same time as the wave at a frequency $f1$ produced by the secondary clock 106 and the same is the case for the waves at frequencies $f2$ and $f3$.

The case is also the same for the waves produced by the auxiliary transmitters, which are associated with those produced by the auxiliary clocks 107 and 108 to be compared therewith in the discriminators 116 and 117.

Each of the comparisons between two waves at a same frequency is performed within a very short time interval, advantageously of the order of about 10 microseconds, and at a maximum equal to 50 microseconds with a view to making use only of the beginning of the pulse received and to cutting out the sky waves.

To this end, the discriminators 115, 116 and 117 are controlled by the programming means 109, 110 and 111, so as to allow the passage of the waves from the amplifier 120 only at the desired moments and during the desired time. The output voltages fed by the discriminators 115, 116 and 117 serve for controlling respectively the phase-shifters 102, 103 and 104 as provided by the connectioins 121, 122 and 123 so as to hold each of the auxiliary clocks 106, 107 and 108 in a relative synchronous condition with reference to the primary clock of the corresponding transmitter, that part played by the phase-shifters 102, 103 and 104 consisting both in correcting the drift of the oscillator 100 and in compensating for the modifications in the time of travel of the waves which are ascribable to the movements of the receiver. These phase-shifters are constituted in a manner similar to the phase-shifter 71, it being understood that the speed of phase-shift produced by them should be in a correct relationship no longer with the draft of the oscillator, but also with the speed of the movable part carrying the receiver.

The parts forming the series 106, 109, 112, 115—107, 110, 113, 116—108, 111, 114, 117 are substantially identical, except for the adjustments due to the programming means and they are also identical with the corresponding parts 81, 82, 83, 87 of an auxiliary transmitter; they operate consequently in the same manner and play the same function.

The systems 130, 131 and 132 form means for reading the differences in progression of the clocks. The system 130 receives, on the one hand, the waves and signals produced by the primary clock 105 and, on the other hand, the corresponding waves and signals produced by the secondary clock 106 and this allows finding the difference in operation between the clocks 105 and 106, said difference in operation constituting, as already mentioned, a measure of the distance separating the receiver from the main transmitter.

It is of advantage for the system 130 to receive in fact two series of sinusoidal currents at frequencies $f1$ (1,800 kilocycles), $f2-f1$ (300 kilocycles), $f3-f1$ (50 kilocycles) and 1 kilocycle, which series are produced respectively by the clocks 105 and 106, so that said system 130 measures, through any conventional means, the phase differences between currents having the same frequency, to wit:

$\varphi 1$ at 1,800 kilocycles
    $\varphi 2$ at 300 kilocycles
    $\varphi 3$ at 50 kilocycles
    $\varphi 4$ at 1 kilocycle the phase $\varphi 4$ executes one revolution for a travel over 300 km., $\varphi 3$ for travel over 6 km., $\varphi 2$ for a travel over 1 km. and $\varphi 1$ for 160 m., so that one hundredth of a revolution of $\varphi 1$ corresponds to a travel over 1.60 m.

This defines the distance separating the receiver from the main transmitter within one meter and a possible ambiguity by 300 km. which is readily removed by any conventional means.

Similarly, the system 131 and 132 produce differences in operation between the primary clock 105 and the auxiliary clocks 107 and 108, said differences in operation defining the distances separating the receiver from the auxiliary transmitters.

If the receiver is carried for instance aboard a ship, it is sufficient to obtain two data as to its distance from known points in order to define its position. The systems 130, 131 and 132 provide three measurements of distances. A redundant information is thus obtained which allows obtaining the absolute synchronism of the clock 105. To this end, the outputs of the systems 130, 131 and 132 are applied to calculating means 133 which examine their coherence so as to calculate a voltage sent back by the lead 134 with a view to controlling the phase-shifter 101, whereby the primary clock 105 is held in perfect synchronism with the main clock of the main transmitter.

It is an easy matter to ascertain that the indications supplied by the systems 130, 131, 132 supply sufficient data for the definition, in an unequivocal manner, of the distance separating the receiver from the main transmitting station, and, when said distance has been ascertained, it is possible to control in its turn the phase-shifter 101 in a manner such as to set the primary clock 105 in absolute synchronism wtih the primary clocks of the transmitting stations.

It is apparent that the phase-shifter 101 plays the same function as the phase-shifter 71, taking into account the fact that normally the output voltage of the calculating means 133 is permanent, whereas that of the discriminator 87 appears only as a pip of a very short duration. The phase-shifter 101 is therefore constituted in a manner similar to the phase-shifter 71, the action of the output voltage fed by the calculating means 133 being much slower, so as to allow a very energetic filtering. Said filtering is, as a matter of fact, such as to improve substantially the accuracy of the results obtained.

We will now disclose briefly, by way of example, a method for setting the secondary clocks of the receiver in relative synchronous relationship and for setting the primary clock of the same receiver in a perfect synchronous condition. Obviously, the method disclosed is given only by way of exemplification and said synchronization may be obtained through any other known or suitable means. It is assumed, in this case, that the setting in absolute synchronism has been executed previously for the auxiliary transmitters, it being understood that this operation may be performed easily in a manner similar to the method to be disclosed hereinafter.

At the start, the receiver considered is assumed to have just started together with its clocks, said receiver being carried on board a movable member, of which the position is unknown.

In the example considered, the synchronization is obtained starting from the following data:
on the one hand, at the beginning of each cycle of transmission of a duration of 1 second and, more accurately, during the first hundredth of a second of each second, the different transmitters produce simultaneously a pulse of the same frequency $f4$ which has a value different from the frequencies $f1$, $f2$, $f3$ of the carrier waves,
on the other hand, a receiver such as that illustrated in FIG. 7 is associated wtih an oscilloscope and with a secondary receiving circuit adapted to receive permanently the transmitted waves and which may be switched manually onto any one of the frequencies $f1$, $f2$, $f3$ and $f4$.

It will be remarked that the means serving for transmitting or receiving the frequency $f4$ are not illustrated in the drawings, said means being of any known type.

Obviously, the receiver also includes the desired switching means so that it may be set either in a synchronization condition, or else, under normal operative conditions.

The synchronizing operation includes two main stages:
setting of each of the secondary clocks in a relative synchronous condition
setting of the primary clocks in a perfect synchronous condition.

For each secondary clock, the relative synchronization with the primary clock of the corresponding transmitter is performed in its turn in two stages:
identification of the signals received
actual synchronization.

By way of example, we will now describe the setting in a relative synchronous condition of the secondary clock 106 with reference to the main transmitter.

For the first stage, that is the identification of the signals, the switch of the receiver is set in the position corresponding to the reception of the frequency $f4$, the output of the secondary receiving circuit referred to hereinabove being connected with the oscilloscope in which the sweeping period is equal to one operative cycle, that is one second in the example described; said circuit is started operating once per second by the passage through zero of the secondary clock 106, that is at the moment at which all the voltages produced by said clock pass through zero. There is obtained on the oscilloscope a compound signal corresponding to the different pulses $f4$ received by the receiver. The operator acts then manually on the secondary clock 106, for instance through the agency of the arrangements described with reference to FIG. 4, so as to bring the signal observed as near as possible the beginning of the sweeping period. This adjustment is then made more accurate by increasing the speed of sweeping to make it last $\frac{1}{10}$ and then $\frac{1}{100}$ of a second, while the moment of starting remains unvarying. When the sweeping period lasts $\frac{1}{100}$ of a second, the operator adjusts the secondary clock so as to bring the beginning of the signal received into a predetermined position; said adjustment may be advantageously made in a more accurate manner by taking into account at the start the estimated magnitude of the distance separating the receiver from the nearest transmitter, said magnitude defining the position to be considered.

Once said adjustment has been executed, the secondary clock 106 is approximately in synchronism with the primary clock of the transmitter with an error of less than a few milliseconds and it is thus possible to individualize and to localize each hundredth of a second of the transmission cycle and, consequently, to identify the signals produced by the main transmitter which corresponds to the secondary clock 106 and, for this reason, we may term "identification of the signals" the operation which has just been referred to.

During the second stage, the switch of the receiver is set on the position corresponding to the frequency $f1$ and the sweeping, always within $\frac{1}{100}$ of a second, is started by the signal passing out of the member 61 of the programming means 109 associated with the secondary clock 106, the series number of the main transmitter corresponding to the hundredth of a second allotted to its transmission (.02 in the above example) being given out by the switches feeding the leads 56 and 58.

The oscilloscope is supplied with the output voltage of the auxiliary circuit of the receiver; the operator checks that the oscilloscope shows a signal corresponding to the reception of the pulse $f1$ produced by the main transmitter and he acts on the secondary clock 106 so as to shift said signal into the vicinity of the beginning of the sweeping period.

The image observed is then enlarged by increasing the speed of sweeping within one thousandth of a second and there is superposed thereto at the input of the oscilloscope the signal produced by the means 59 so as to form a reference mark on the oscilloscope, near its medial point, and the operator acts on the secondary clock 106 so as to bring the beginning of the pulse received into registry with said reference mark.

Said adjustment may be made more accurate by enlarging the image still further, in which case the secondary clock 106 is set in relative synchronism with the primary clock of the main transmitter with an error of a few milliseconds at the utmost.

It is possible to still further increase said accuracy in synchronism by proceeding then with the synchronization with a possible error by one cycle for each of the carrier waves $f1$, $f2$, $f3$, of the pulses received from the main transmitter with the waves of same frequencies produced by the secondary clock 106, which may be obtained by resorting to the phase relationship between the radiated and the received waves. To this end, the operator resorts again to the oscilloscope to which he applies now horizontally the values of the cosines and vertically the values of the sines of the angle corresponding to the phase-shifting between the two waves to be compared. He observes on the oscilloscope a radially extending straight line forming an angle with the horizontal line which defiines said angle; the values of the sine and cosine are produced by the discriminator 115 which is suitably fed by the secondary circuit through the switching means providing for synchronization.

Beginning with the wave $f1$, the switch of the receiver being in its position $f1$, the operator acts on the secondary clock 106 so as to bring said straight line into a horizontal direction towards the right-hand side.

He acts also through suitable means on the speed of the phase-shifter 102 so as to compensate for the shift produced by the relative movement of the movable part carrying the receiver with reference to the main transmitter during the adjusting operations and to hold said radially extending straight line in the desired horizontal position.

The same procedure is then followed for the two waves $f2$ and $f3$ by setting in succession the switch in the position corresponding to $f2$ and in the position corresponding to $f3$.

When said operations are ended, the secondary clock 106 is exactly in relative synchronism with the primary clock of the main transmitter and it is then possible to set said secondary clock under normal operative conditions under the control of the incoming pulses.

The same procedure is followed for the other secondary clocks 107 and 108 of the receiver.

For the second stage providing absolute synchronism for the primary clock, the procedure is also executed in two steps, to wit:

an approximate synchronization
a complete synchronization.

The first step is identical with the stage of identification of the signals as disclosed hereinabove for the secondary clocks and it leads to setting the primary clock 105 of the receiver in synchronism with the primary clocks of the transmitters with a maximum error of a few milliseconds, which corresponds to an approximate synchronism.

For the second stage, the operator restors to the data or information supplied by the reading means 130, 131, 132. The positions of the different transmitters being known, these three informations should be coherent and it is therefore necessary to act on the primary clock 105 so as to obtain such a coherence.

Said operation being performed, the primary clock of the receiver is in perfect synchronism with the primary clocks of the transmitters and the receiver is then set for normal operation.

The synchronization of the receiver being then at an end, the receiver is ready to operate.

Of course, it may be of advantage with a view to ensuring a greater economy and, more particularly, with a view to reducing the number of frequencies radiated, to use as an identification frequency $f4$ any one of the other frequencies $f1$, $f2$, $f3$, the modus operandi for the synchronization of the receiver remaining then substantially the same as that disclosed hereinafter.

An important advantage of the use, chiefly at the receiving station of primary and secondary clocks controlled by a very stable oscillator is disclosed hereinafter.

To disclose said advantage, it will be assumed that, after the different receiver clocks have been synchronized, one of the three transmissions is no longer received for any reason whatever and the consequences resulting from such a failure are compared now in two different cases:

in the first case, the receiver is of a conventional type which is not in conformity with our invention and measures only differences in distances whereas the second case corresponds to a receiver executed in conformity with our invention and is adapted to measure actual distances.

It is a well-known fact that, under such conditions, the receiver in the first case supplies only one information which is not sufficient for defining the location of the movable receiver and, consequently, the operator is constrained, for instance, to complete this information by estimations, whereby the position of the movable receiver thus obtained is bestowed with an error proportional to the drift or shift of said movable receiver, such as an error in direction, a drift due to wind or a stream, which increases in proportion with the duration of the failure.

In the second case, it is readily apparent that the receiver is not capable of correcting the residual drift of its oscillator, but it continues however supplying two indications as to distance, which latter are sufficient for defining the location of the movable receiver, while both indications as to distance are bestowed with the same error, which is proportional to the drift of the oscillator and increases with the duration of the failure.

It will be remarked immediately that in the second case:
on the one hand, there is no reduction in the amount of information supplied with reference to the first case, since it is always possible to obtain with the same accuracy the difference between the distances on the other hand, the error produced by the drift of the oscillator is practically lower than that arising in the case of an estimation.

As a matter of fact, the ratio between the errors in the first and in the second case is equal to the ratio between the drifts; now, it is a well-known fact that the drift of a high grade quartz is of a magnitude of $10^{-9}$ which corresponds to a drift of 30 cm. per second, which value is clearly lower than the magnitude generally allowed for the drift of a movable part under the action of various causes such as wind, streams and the like.

Similarly, if the receiver receives only the transmissions from a single transmitting station, it is obvious that in the first case considered, the receiver supplies no further indication, whereas, in the second case, that is with a receiver according to our invention, there is still obtained an information as to radial distance, which is bestowed with an error proportional to the drift of the quartz and, consequently, smaller than the errors arising with the conventional methods of estimation of the location of the movable part.

It should be remarked that in the case of an auxiliary transmitter, if for any reason whatever, said transmitter no longer receives the waves transmitted by the main transmitter with a view to keeping the primary clock thereof in perfect synchronism with the primary clock of said main transmitter, its primary clock will begin drifting and the condition of perfect synchronism between all the transmitters is no longer satisfied. Said drawback is practically cut out by resorting to a modification of the system described precedingly, which modification resorts chiefly to using transmitters which are all identical, each transmitter being synchronized with at least two adjacent transmitters and to this end, each transmitter includes a primary clock and several secondary clocks, said secondary clocks being set in relative synchronism with the primary clocks of the adjacent transmitters. More accurately and referring to FIG. 6, the transmitter includes means equivalent to two or more discriminators 87 and said means produce an average of the output voltage of such discriminators and apply said average magnitude with suitable time constants to the phase-shifter 71.

Practically, this leads to the fact that the highly stable frequency controlling the different clocks of the transmitters forms an average of the frequencies fed by the oscillators of the different transmitters.

An important advantage of said modification is as follows:

If for any reason whatever the transmissions of one or more transmitters are not received by the other transmitters, the primary clocks of said transmitters remain in perfect synchronism.

It should be remarked that this modification does not lead to any modification as concerns the reception and synchronization, as described hereinabove.

What we claim is:

1. A radio location system of the type, comprising:
   a plurality of transmitters including a main transmitter and auxiliary transmitters located at known points and each having transmitter means radiating in turn pulses at different frequencies in accordance with a cycle;
   receiver means at a receiver station operable to detect the phase relationship between the waves radiated from said transmitter means to ascertain the position of the receiver station;
   each transmitter and receiver means including:
   primary clock means, first means operatively connected with said primary clock means for operating all of said primary clock means in substantially perfect synchronism, and second means at each transmitter means for controlling the transmission of waves by the respective primary clock means,
   secondary clock means at each auxiliary transmitter and each receiver means, each transmitter station having one secondary clock means and the number of secondary clock means at a respective receiver means corresponding to the number of transmitter stations,
   third means at each auxiliary transmitter operatively connected with a respective secondary clock means for operating the secondary clock means in relative synchronism with the primary clock means of the main transmitter,
   fourth means in each receiver means operatively connected with the secondary clock means thereof for operating a respective secondary clock means thereof in relative synchronism with the primary clock means of a corresponding transmitter means;
   and output means in a respective receiver means operatively connected with the secondary clock means thereof for indicating with reference to a respective transmitter means the differences in time equal to the times of travel of the waves from one station to another.

2. A system according to claim 1, wherein said clock means include generator means producing a plurality of signals whose periods are all integer sub-multiples of the same base period.

3. A system according to claim 1, wherein said primary clock means include control means controlling the moment of beginning and end of transmission of the different frequencies of said transmitter means.

4. A system according to claim 1, further comprising gate means controlling the reception at a respective auxiliary transmitter and receiver means, and further control means operatively connecting said secondary clock means with said gate means for eliminating effectively the reception of the sky-waves.

5. A system according to claim 1, wherein each primary clock means includes first generator means producing oscillations of a highly stable frequency, a plurality of auxiliary oscillator means, first frequency control means operatively connected between said first generator means and a first auxiliary oscillator means for controlling the frequency of oscillations of the latter by the former, second frequency control means operatively connected between said first generator means, said first auxiliary oscillator means and a second auxiliary oscillator means for effectively controlling the frequency of oscillations of the latter at least by said first generator means, third frequency control means operatively connected between said first generator means and a third auxiliary oscillator for controlling the frequency of oscillations of the latter by the former, and frequency divider means operatively connected with said third auxiliary oscillator means.

6. A system according to claim 1 wherein each primary clock means includes a plurality of oscillators, frequency control means operatively connected with at least some of said oscillators to control the frequency thereof by the frequency of the main transmitter means to thereby produce the said frequencies of the auxiliary transmitter stations, and frequency divider means operatively connected with one of said oscillators for producing sub-multiple frequencies of said cycle.

7. A system according to claim 6, wherein each frequency control means includes a mixer to which are applied the oscillations from a respective oscillator and the frequency of the main transmitter means, a multiplier connected to a respective mixer, a discriminator connected to a respective multiplier, and adjusting means for adjusting the frequency of a respective oscillator.

8. A system according to claim 7, wherein said adjusting means includes means for selectively adjusting each oscillator in steps of one cycle.

9. A system according to claim 8, wherein said adjusting means includes capacitor means, means for selectively applying to said capacitor means a predetermined charge, and means for controlling the frequency of a respective oscillator by the corresponding predetermined charge.

10. A system according to claim 1, further comprising switch means operatively connected directly with some of the outputs of each clock means, and program means operatively connecting a clock means with said switch means in such a manner that said switch means are operated in succession.

11. A system according to claim 10, wherein each clock means produces oscillatory energy corresponding to the transmitted frequencies of said transmitter means, said switch means including a number of electronic switches equal to the number of transmitter stations, said program means including a plurality of "AND" circuit means for producing a plurality of shifted pulses equal in number to electronic switches and having different shifts in time with respect to the beginning of said cycle, a respective "AND" circuit means being operatively connected with a corresponding electronic switch.

12. A system according to claim 11, further comprising sampler means operatively connected with the outputs of said electronic switches and controlled by one of said "AND" circuit means.

13. A system according to claim 11, further comprising discriminator means connected to the output of the electronic switches, means for applying to said discriminator means the signals received from the transmitting stations, and means controlling said discriminator means by said program means.

14. A system according to claim 1, which comprises one main transmitter means and two auxiliary transmitter means for effectively measuring at each receiver means three distances, oscillator means controlling said clock means, and means at each receiver means for controlling the coherence between said measurements including correcting means for correcting the drift of the oscillator means while maintaining perfect synchronism between the primary clock means.

15. A system according to claim 1, in which at least three transmitting means are provided all identical with one another, and each transmitter means being synchronized with at least two adjacent transmitter means.

16. A system according to claim 1, wherein each auxiliary transmitter means includes a highly stable oscillator, primary clock means operatively connected with the input thereof to said oscillator, a plurality of switch means connected wtih the input thereof to said primary clock means, sampler means connected with the input thereof to the output of said switch means, means for transmitting the output of said sampler means, control means including program means operatively connecting said primary clock means with said switch means and said sampler means to control operation of the latter by the former, secondary clock means connected with the input to said oscillator, a plurality of further switch means connected with the input thereof to said secondary clock means, a discriminator connected with one input thereof to the output of said further switch means, means for applying the received signals transmitted by such transmitter means to the other input of said discriminator, phase-shifter means in the output of said oscillator, connecting means controlling the phase-shifter means by the output of said discriminator, and further control means including further program means operatively connecting said secondary clock means with said further switch means and said discriminator to control the operation of the latter by the former.

17. A system according to claim 1, wherein each receiver means includes a highly stable base oscillator, primary clock means and a plurality of secondary clock channels, variable phase-shifter means connecting said oscillator with the input of said primary clock means, each secondary clock channel including secondary clock means, variable phase shifter means connecting the oscillator with the input of a respective secondary clock means, switch means connected to the output of a respective secondary clock means, discriminator means connected to the output of respective switch means, means for applying the received signals to said discriminator means, control means including program means operatively connecting the secondary clock means of a respective channel with the switch and discriminator means thereof to control the latter by the former, and means operatively connected with said clock means for determining the exact position of a receiver means by measuring the differences in the progression of the clock means.

References Cited by the Examiner
UNITED STATES PATENTS 3,150,372    9/1964    Groth _____ 343—112

CHESTER L. JUSTUS, *Primary Examiner.*